April 11, 1939. C. A. HEYNE 2,154,126
APPARATUS FOR HANDLING BOTTLES AND JARS
Filed May 11, 1937 8 Sheets-Sheet 1

Clarence A. Heyne
INVENTOR.

BY Rule & Hope
ATTORNEYS.

April 11, 1939.    C. A. HEYNE    2,154,126
APPARATUS FOR HANDLING BOTTLES AND JARS
Filed May 11, 1937    8 Sheets-Sheet 2

Clarence A. Heyne
INVENTOR.
BY Rule & Hoge
ATTORNEYS.

April 11, 1939.  C. A. HEYNE  2,154,126
APPARATUS FOR HANDLING BOTTLES AND JARS
Filed May 11, 1937   8 Sheets-Sheet 5

Clarence A. Heyne
INVENTOR.
BY Rule & Hoge
ATTORNEYS.

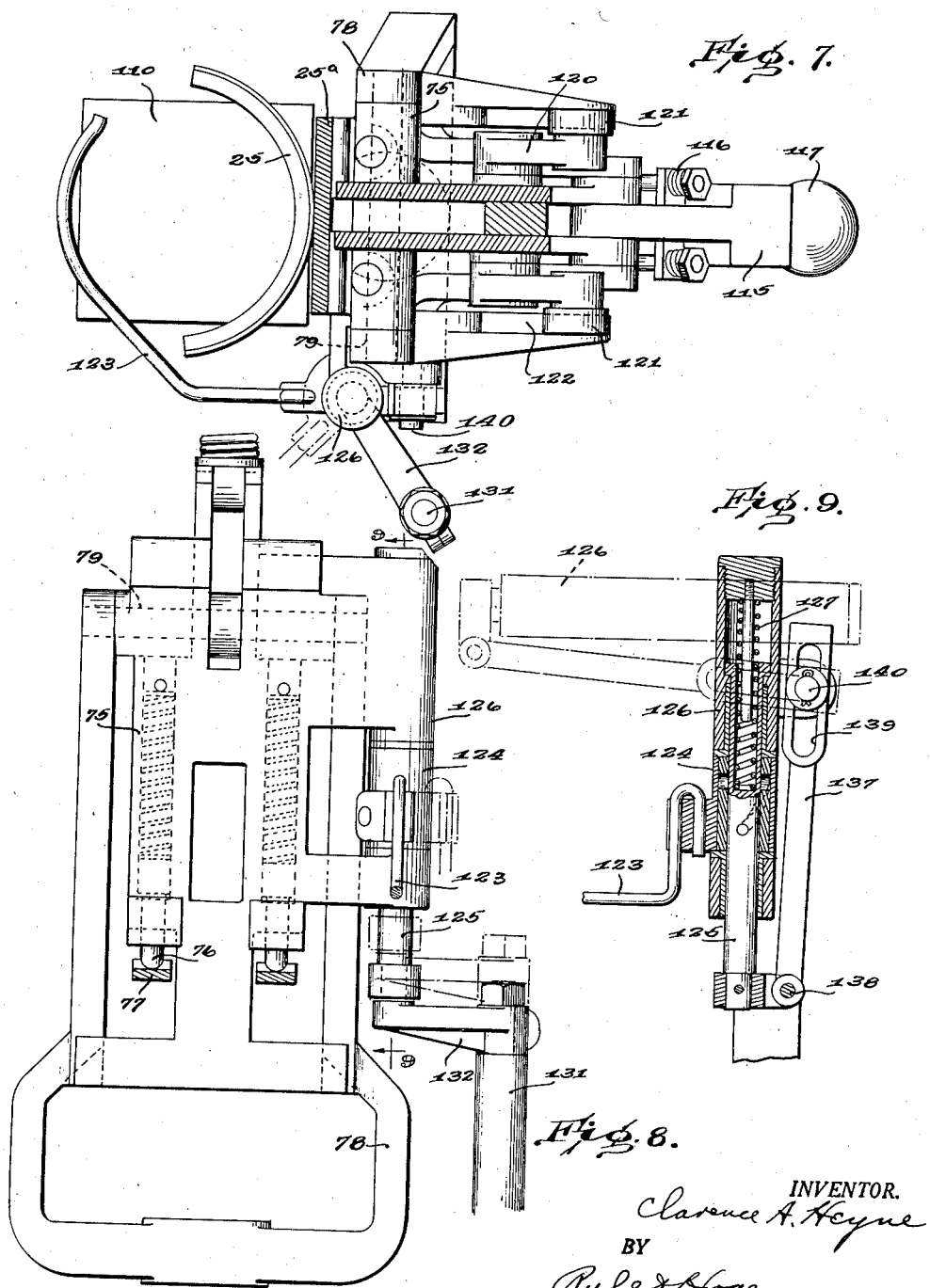

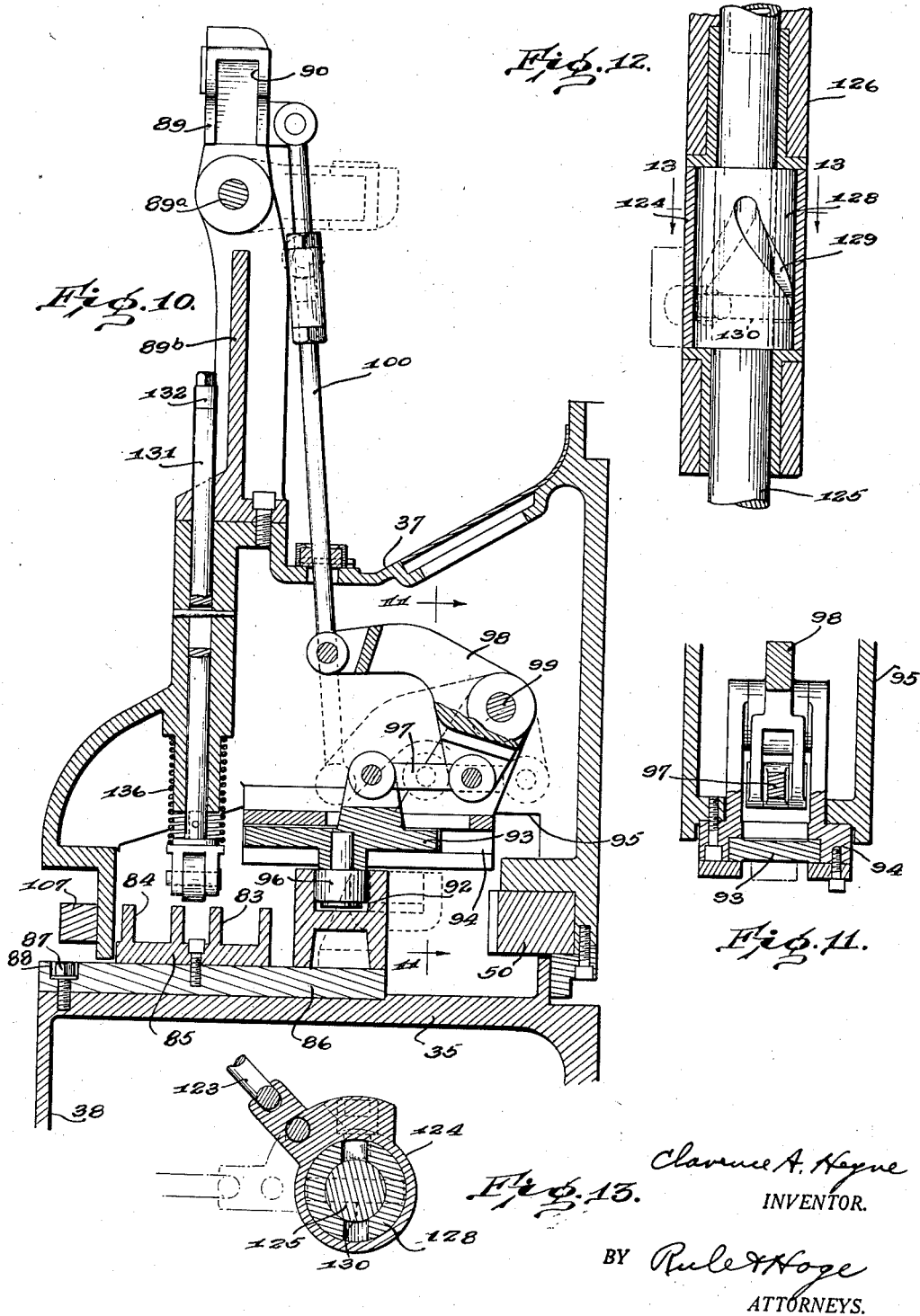

April 11, 1939.  C. A. HEYNE  2,154,126
APPARATUS FOR HANDLING BOTTLES AND JARS
Filed May 11, 1937  8 Sheets-Sheet 8
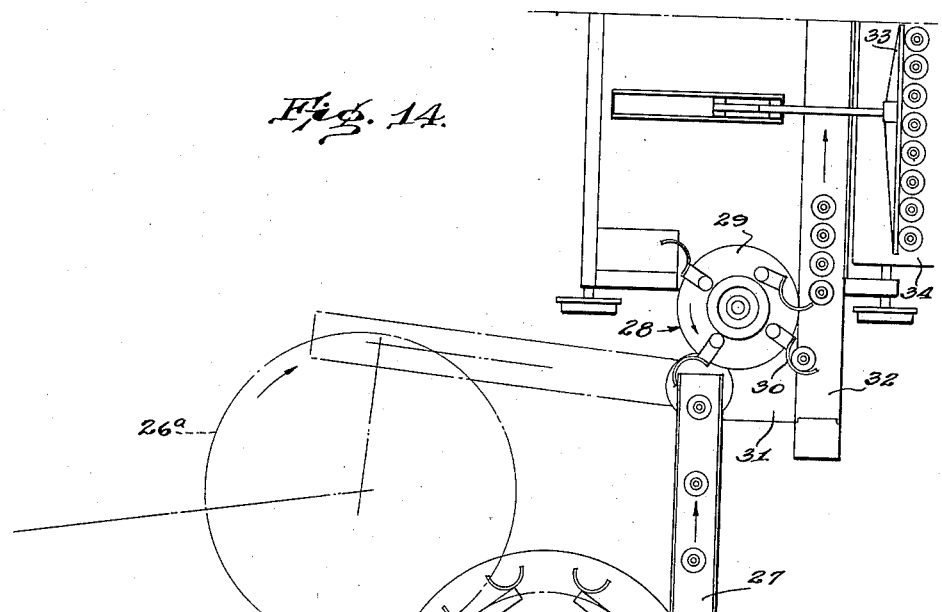
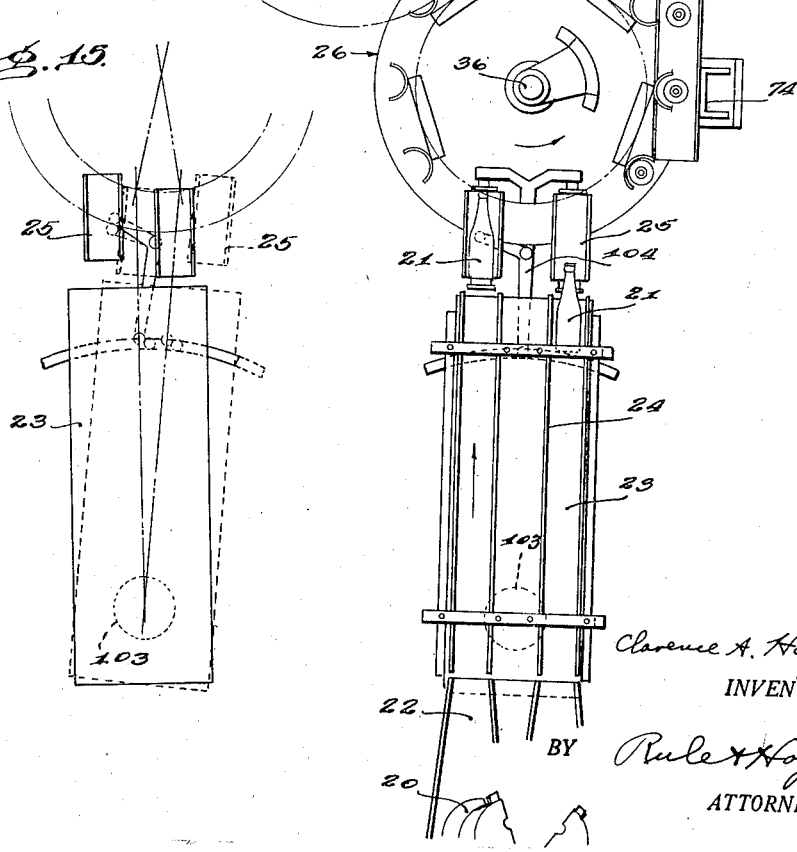
Clarence A. Heyne
INVENTOR.
BY Rule & Hoge
ATTORNEYS.

Patented Apr. 11, 1939

2,154,126

UNITED STATES PATENT OFFICE 2,154,126

APPARATUS FOR HANDLING BOTTLES AND JARS

Clarence A. Heyne, Alton, Ill., assignor to Owens-Illinois Glass Company, a corporation of Ohio Application May 11, 1937, Serial No. 141,986

14 Claims. (Cl. 198—209)

My invention relates to apparatus for handling articles such as bottles and jars, and more particularly to an automatic apparatus for receiving the articles in a recumbent position after they have been discharged from the forming machine, uprighting the articles and transferring them in an upright position to a conveyor by which they are carried toward an annealing leer. The present invention in the form herein illustrated and described includes certain mechanism similar to parts of the apparatus disclosed in the patent to Benoit, 1,981,642, November 20, 1934, and is designed for the same general purpose.

An object of the present invention is to provide an apparatus which, as compared with that disclosed in said patent, is materially simplified and embodies various improvements thereover.

A further object of the invention is to provide an apparatus which is readily adjustable to adapt it for transferring articles from various positions at which the article forming machine may be located relative to the annealing leer.

Other objects of the invention will appear hereinafter.

The principal features of novelty embodied in the present invention relate to the mechanism for receiving the articles in a horizontal or recumbent position and turning them to an upright position, such apparatus being herein termed an "uprighter." The apparatus is herein shown as designed and used for handling bottles, although it will be understood that it may be adapted for use with other forms of articles.

Referring to the accompanying drawings:

Fig. 7 is a part sectional plan view showing a cradle and associated mechanism;

Fig. 8 is an elevation showing a cradle holder;

Fig. 9 is a sectional elevation of mechanism for swinging an article holding finger, the section being taken at the line 9—9 on Fig. 8;

Fig. 10 is a vertical section taken radially of the uprighter and showing a portion thereof at one side of its axis, and particularly the cradle swinging mechanism;

Fig. 11 is a sectional detail showing mechanism for swinging a pair of cradles, the section being taken at the line 11—11 on Fig. 10;

Fig. 12 is a detail view showing a cam for swinging a holding finger;

Fig. 13 is a section at the line 13—13 on Fig. 12;

Fig. 14 is a diagrammatic view showing the arrangement of the apparatus for transferring the bottles from a blowing mold to the annealing leer; and Fig. 15 is a diagrammatic view illustrating the manner in which the pony conveyor is oscillated and the cradles swung to maintain them in alignment with said conveyor while the bottles are being transferred to the cradles.

Figure 1:
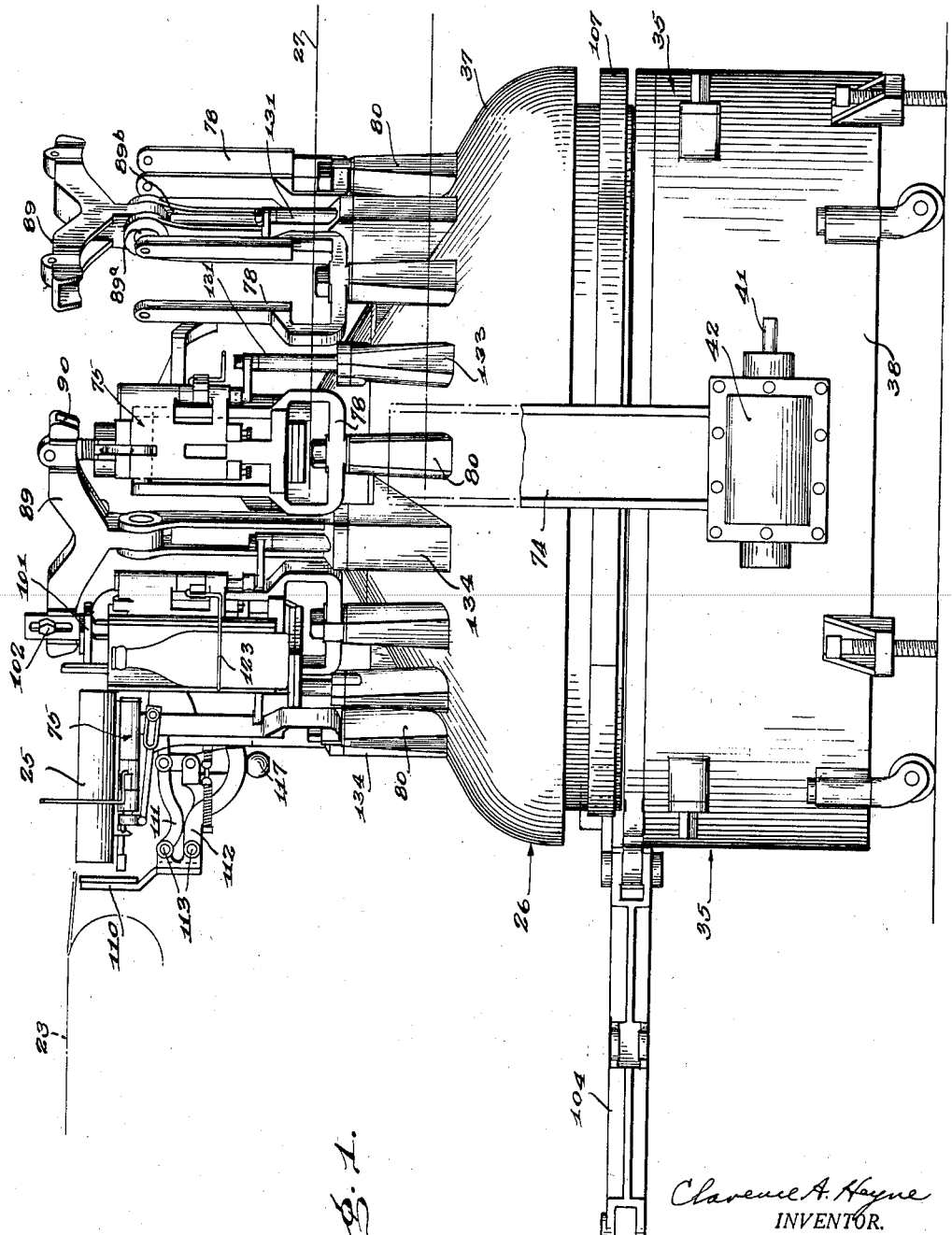
Fig. 1 is an elevation of the uprighter.

The general arrangement of the apparatus for transferring the bottles or other articles from a forming machine to the leer will be understood by reference to Fig. 14. The apparatus as here shown is designed for transferring bottles which are discharged in pairs from the molds 20 of the forming machine. The bottles 21 as they are discharged from the mold move down an inclined chute 22 onto an endless conveyor 23 ordinarily referred to as a pony conveyor. The bottles are carried neck end first along the conveyor, being guided by means of guiding strips 24, and pass from the conveyor onto a pair of cradles 25 on the uprighting device 26 which rotates continuously about a vertical axis. The cradles are brought to a horizontal position in line with the conveyor to receive the bottles and are then swung to a vertical position for uprighting the bottles, the latter being then discharged onto an endless belt conveyor 27 by which they are conveyed to a loading device 28 which, as here shown, may be of conventional form. This loading device comprises a rotating disk 29 carrying a series of arms 30 which sweep the bottles from the conveyor 27 over a table 31 onto a hot belt or carrying-in conveyor 32. A pusher bar 33 operates periodically to push a row of bottles from the belt 32 onto the leer conveyor 34. The transfer apparatus, except as regards the uprighting mechanism 26, may be of usual construction.

Figure 3:
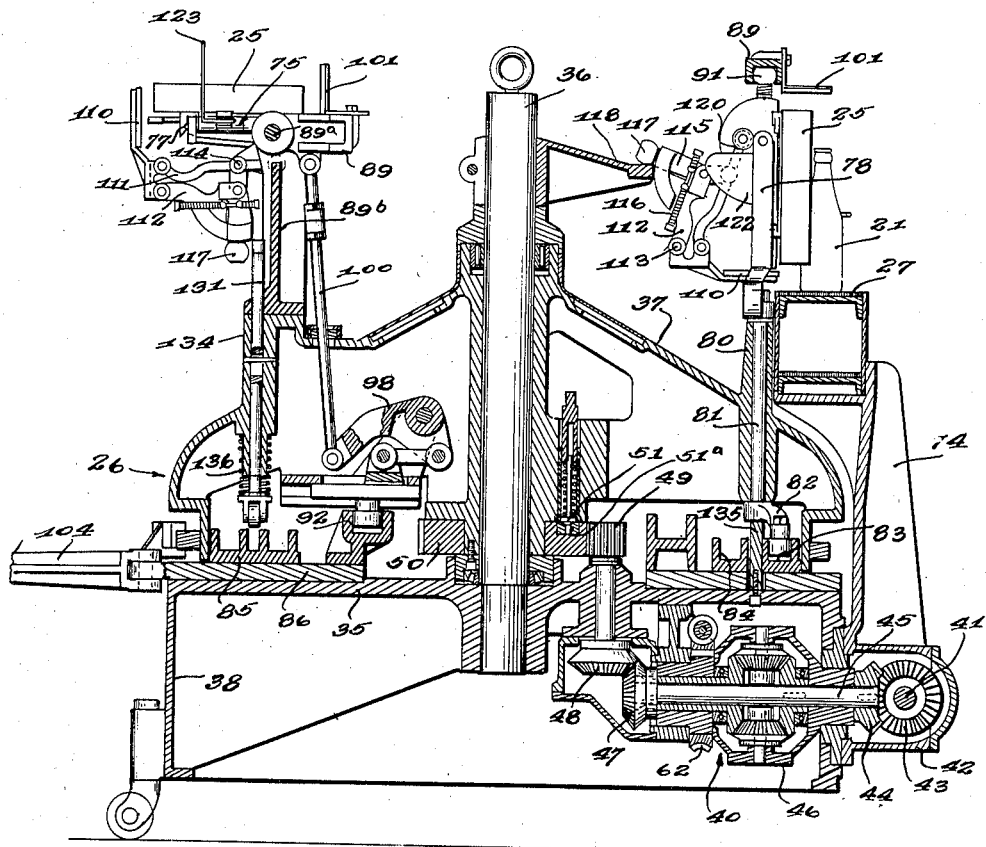
Fig. 3 is a central sectional elevation thereof.

The uprighter 26 comprises a wheeled base 35 (see Figs. 1 and 3) from which rises a stationary center column or standard 36. The cradles 25, their carriers, and associated mechanism are supported on a carriage 37 mounted for continuous rotation about the standard 36. The body of the carriage is substantially in the form of a bell or dome arranged over the base 35 and providing a housing for parts of the operating mechanism. The base 35 is formed with a depending peripheral flange or wall 38 which provides a housing for driving mechanism 40 by which the carriage 37 is rotated.

Figure 2:
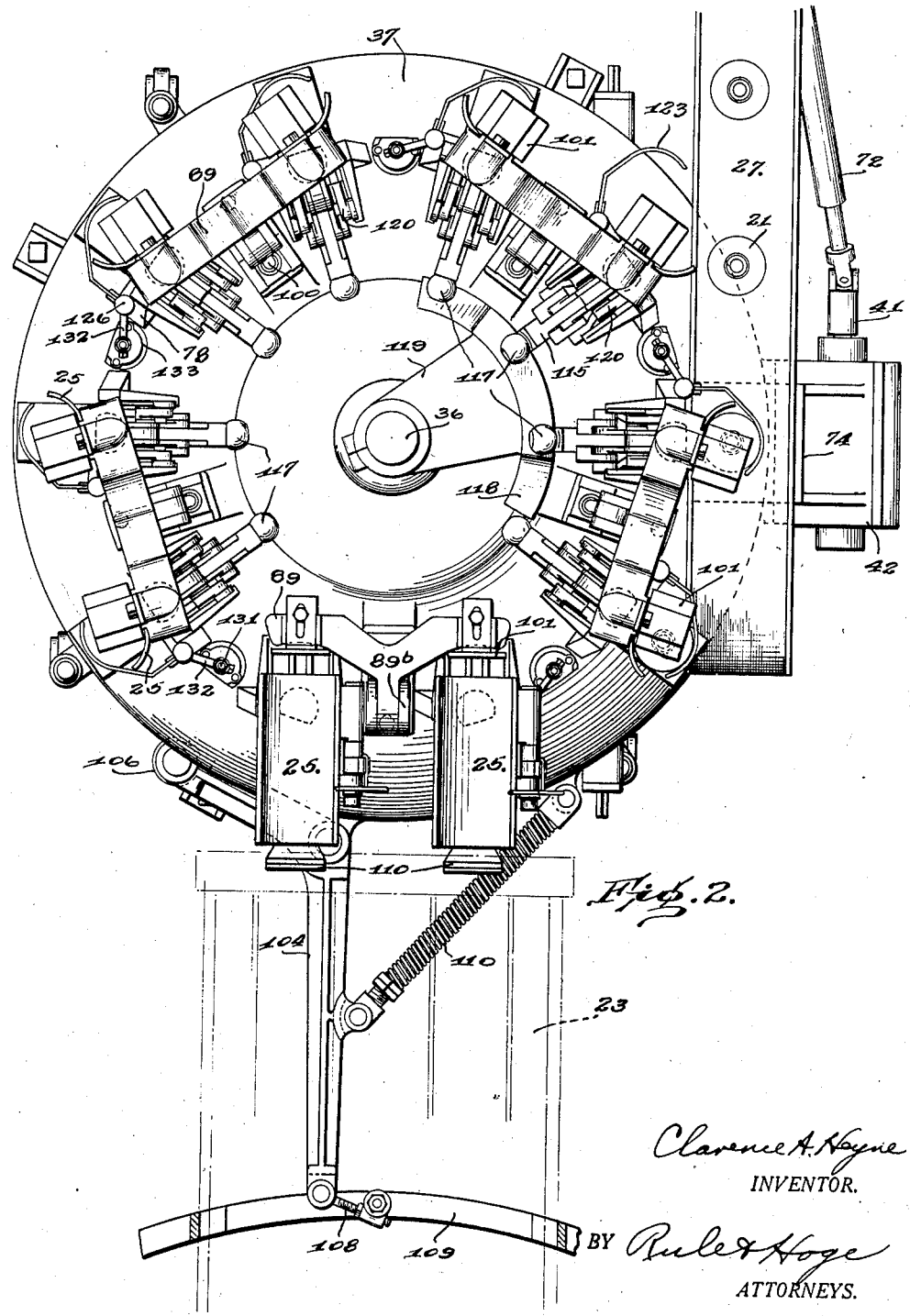
Fig. 2 is a plan view of the same.

The driving mechanism 40 includes a driving shaft 41 (Figs. 2, 3 and 5) extending through a gear case 42 on the machine base and having driving connection through miter gears 43 and 44 with a shaft 45 extending through a differential gear casing 46. The shaft 45 operates through differential gearing within the casing 46 to drive bevel gears 47 and 48, the latter mounted on a vertical shaft carrying a pinion 49 which drives a gear 50 mounted to rotate about the center post 36.

A driving connection between the carriage 37 and the gear 50 is provided by means of a spring pressed detent or detents 51 mounted in the hub of the carriage and engaging recesses 51a in the gear 50. The detents are released under any abnormal strain, permitting the gear 50 to rotate independently of the carriage, thus serving as a safety device in the event of any obstruction to the movement of the carriage. The recesses 51a (see Fig. 4) are spaced at angular distances around the axis of the machine corresponding with the spacing of the uprighting units, whereby temporary stoppage of the carriage will not interfere with the synchronized gearing of the carriage and conveyors. The differential gear casing 46 is rotatably adjustable about the axis of the shaft 45 by means of a worm gear adjusting device 62 which may be of conventional construction. This permits a rotative adjustment of the carriage 37 for timing the movements of the uprighting mechanism to bring it into synchronism with the delivery of bottles to the cradles.

Figure 5:
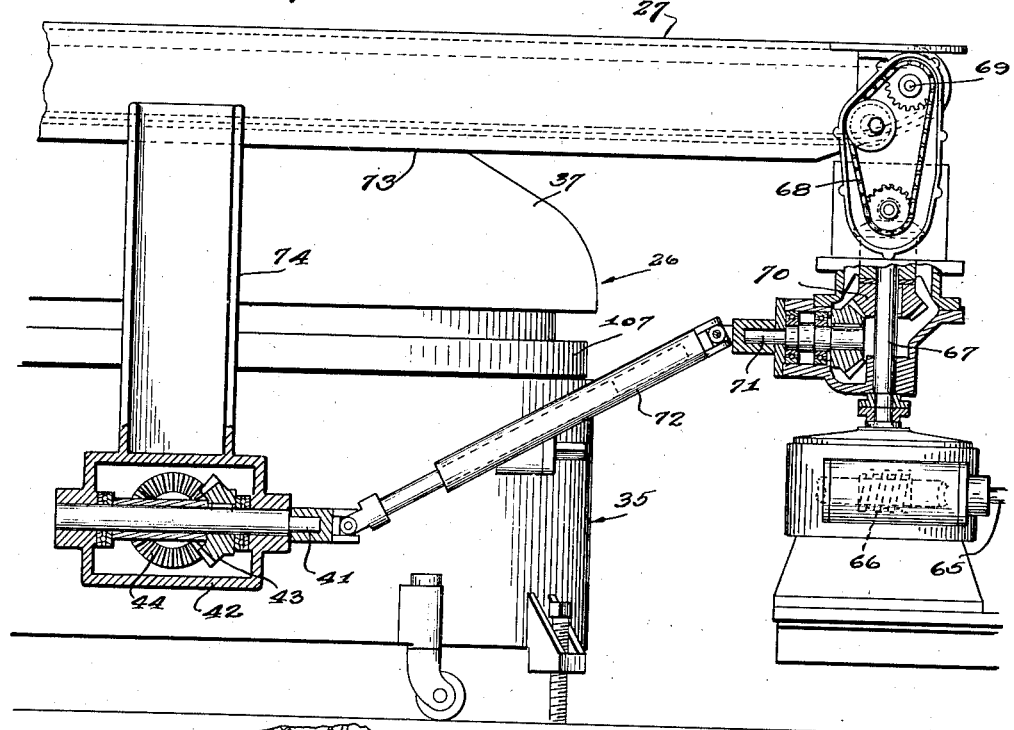
Fig. 5 is a fragmentary part sectional elevation showing mechanism for rotating the uprighter carriage and for driving the main conveyor.
Figure 6:
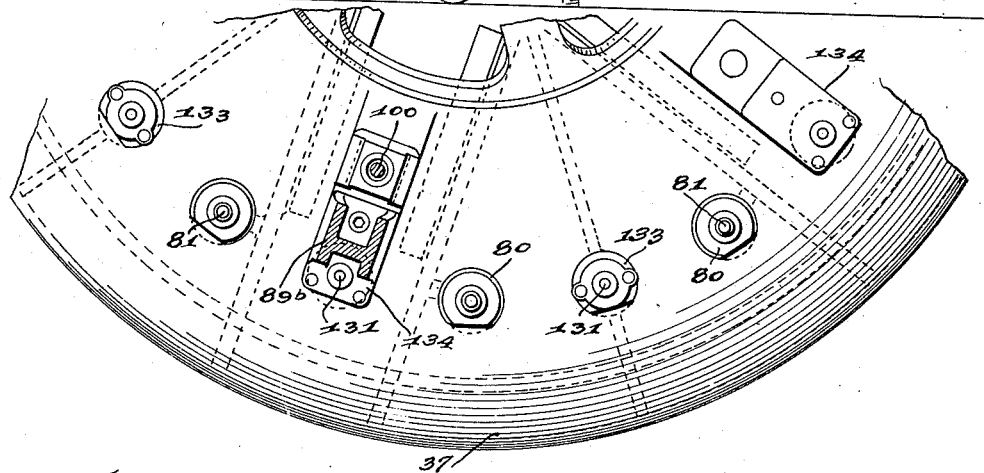
Fig. 6 is a fragmentary plan view showing a portion of the rotating bell or carriage on which the cradles are mounted, the cradle mechanism being omitted.

As shown in Fig. 5, the shaft 41 is interconnected with the gearing for driving the main conveyor 27. A drive shaft 65 operates through worm gearing 66 and drives the vertical shaft 67 which has driving connections, including sprocket gears and chain 68, with the conveyor drive shaft 69. The shaft 67 also operates through bevel gears 70 to drive a shaft 71. Driving connections between the shaft 71 and the shaft 41 include a shaft 72 comprising telescoping sections having universal joint connections with the shafts 71 and 41 respectively. It will be seen that by means of the gearing above described, the conveyor 27 and uprighting mechanism are driven in timed relation and at a fixed relative speed. The drive shaft 65 (Fig. 5) is also preferably driven from the bottle forming machine or interconnected therewith, and with the loader 29 and the carrying-in conveyor 32, so that the operations of all the transfer devices are maintained in synchronism. The conveyor 27 is carried on a conveyor frame 73 supported in spart on a bracket arm 74 rising from the gear casing 42.

The uprighting mechanism comprises an annular series of units arranged symmetrically about the axis of the carriage, said units being identical in construction, so that only one need be described in detail. As before noted, each said unit comprises a pair of cradles 25. The cradles are removably attached to holders 75 individual thereto. The means for attaching the cradles to the holders may be substantially the same as disclosed in the above mentioned patent to Benoit, to which reference may be had for a detailed description. Such attaching means includes spring actuated detents 76 (Fig. 8) carried by the holders 75. The detents engage notched lugs 77 on back plates 25a on which the cradles are mounted.

Each holder 75 is pivotally connected to a vertical yoke 78 by a pivot pin 79 at the upper end of the yoke, to permit the cradle to be oscillated between horizontal and vertical positions. Each yoke 78 is supported on a bearing sleeve or post 80 (see Figs. 1 and 3) on the dome of the carriage. The yoke is attached to a vertical rock shaft 81 which extends downward through the hollow post and carries at its lower end a rock arm 82 having a cam roll to run in one of a pair of stationary cam tracks 83 and 84 so that as the carriage rotates, the shaft 81 is periodically rocked and thereby imparts oscillating movement to the yoke 78 and the cradle carried thereby, for a purpose hereinafter set forth.

The cam tracks 83 and 84 are formed on an annular cam plate 85 (Figs. 3 and 10) mounted on an annular cam supporting plate 86 on the machine base 35. The plate 86 is secured to the base by means of bolts 87 (Figs. 4 and 10) extending through slots 88 in said plate which permit angular adjustment of the plate about the axis of the carriage for a purpose hereinafter set forth.

Each pair of cradles 25 are rocked about the axes of their shafts 79 by mechanism including a yoke 89 journaled on a pivot pin 89a (Fig. 10) in the upper end of a standard 89b, said yoke being formed with a groove or channel 90 to receive bearing balls or heads 91 on the cradle carriers. The mechanism for rocking the yoke 89 comprises a cam track 92 mounted on the plate 86. A slide block 93 (Figs. 10 and 11) is mounted for reciprocating movement in guides 94 which may be attached to a web 95 formed on the carriage. A cam roll 96 on the slide block runs on the track 92, the latter shaped to reciprocate said block as required to swing the cradles. A link 97 connects the slide 93 with one arm of a bell crank 98 fulcrumed at 99, the other arm of the bell crank being connected through a rod 100 to the yoke 89. The cam track 92 is so designed that it operates through the mechanism just described to swing the pair of cradles to a horizontally disposed position while they are traveling past the conveyor 23, so that the bottles 21 as they leave the conveyor are directed onto the cradles. The yoke 89 carries stop plates 101 which serve to arrest the bottles as they are brought to position on the cradles. The stop plates 101 have a slot and pin connection 102 with the yoke, which permits adjustment to accommodate bottles of different lengths.

In order to retain the pony conveyor 23 in register with the cradles while the bottles are being transferred to the cradles, means are provided for oscillating the conveyor about a vertical pivot 103. Such means includes a bell crank lever 104 (see Figs. 2 and 4) fulcrumed at 105 on the cam supporting plate 86. A cam roll 106 on one arm of the bell crank, runs on cams 107 arranged in an annular series and mounted on the lower peripheral portion of the carriage dome. The opposite end of the bell crank 104 is adjustably connected by a link 108 with a frame 109 which carries the conveyor 23. An expansion spring 110 serves to hold the cam roll 106 in engagement with the cams. The cams 107 operate the bell crank 104 to advance the conveyor and maintain it in register with each pair of cradles while the latter are receiving the bottles.

It will be noted that the angular movement of the cradles about the axis 36 would prevent them from being maintained in alignment with the conveyor 23 during the bottle transfer period unless provision were made to change the angular position of the cradles relative to the carriage during such transfer. For the purpose of maintaining alignment, the cradle carriers are oscillated individually about vertical axes by rocking their spindles or shafts 81 (Fig. 3) by means of the cam tracks 83 and 84, as heretofore described. By reference to Fig. 4, it will be seen that the rocking movements of alternate shafts 81 are controlled by the cam tracks 83 and 84 respectively. That is to say, the horizontal oscillation of one of each pair of cradles 25 is controlled by the cam 83 and the oscillation of the other cradle of the pair is controlled by the cam 84. These cams are so shaped that the cradles are retained in line with the conveyor 23 during the transfer period. This is illustrated diagrammatically in Fig. 15, wherein the relative positions of the conveyor and cradles at the beginning of the transfer period are shown in full lines and their positions at the end of the transfer period are shown in broken lines.

Cooperating with each cradle 25 is a bottom plate 110 which provides a bottom support for the bottle during the uprighting of the cradle. The bottom plate is carried by a pair of parallel links 111 and 112 connected thereto by pivots 113. The links are connected at or near their opposite ends to the cradle holder by pivot pins 114. An arm 115 has a yielding connection 116 with the links, said connection serving as a safety device. The arm 115 carries a knob 117 adapted to run on a stationary cam 118 formed on a bracket arm 119 (Fig. 2) secured to the center post 36. The cam 118 is so located and shaped that when a cradle 25 reaches the transfer position over the conveyor 27, the arm 115 is rocked by the cam and withdraws the bottom plate from beneath the bottle, allowing the latter to drop onto the conveyor, as indicated at the right hand side of Fig. 3. The links 111 are formed with extensions 120 carrying cam rolls 121 (see Fig. 7) which run on cams 122 on the yoke 78. The cams 122 serve to control the position of the bottom plate while the cradle is in a recumbent position and during its initial uprighting movement.

Associated with each cradle is a holding rod or finger 123 adapted to engage the bottle after it is received in the cradle and hold it in place during the uprighting movement. Referring to Figs. 7, 8, 9, 12 and 13, the holding finger 123 is attached to a hub 124 mounted to rock about the axis of a shaft 125, the latter being mounted for longitudinal movement within a casing 126 attached to or formed integral with the cradle holder 75. The upper portion of the shaft 125 is made hollow to receive a coil spring 127 which maintains a downward pressure on the rod. Secured within the hub 124 for rocking movement therewith is a tubular cam member 128 formed with a pair of oppositely disposed spiral cam slots or grooves 129. A cam pin or stud 130 extends through the shaft 125 with its ends projecting into the cam slots. It will be seen that endwise movement of the shaft 125 will operate through the cam member 128 to rock the holding finger 123 about the axis of said shaft.

Each shaft 125 is actuated by means of a vertical rod 131 having attached thereto at its upper end a laterally projecting arm 132, the free end of which engages beneath the shaft 125. The rods 131 are mounted for up and down movement within the body or dome of the carriage. One of each pair of rods 131 is mounted in a standard 133 (see Fig. 1) rising from the dome of the carriage. The other rod of each pair is likewise mounted in a standard 134, the latter also serving as a base for the standard 89b on which the yoke 89 is mounted. The rods 131 are actuated by a stationary cam 135 (Figs. 3 and 4) bolted to the machine base and positioned between the spaced cam tracks 83 and 84.

When a shaft 125 (Fig. 9) is in its downward position, the holding finger 123 is held in its inward or bottle clamping position. As a cradle 25 with a bottle therein approaches position for the bottle to be released onto the conveyor 27, the corresponding rod 131 is moved upward by the cam 135, thereby pushing the shaft 125 up and swinging the holding finger outward to release the bottle. After the rod 131 passes beyond its cam it drops down to an inoperative position, this movement being made more positive by means of a spring 136 (Fig. 10) which also serves to hold the rod against its cam.

When the cradle is rocked downward from a vertical to a horizontal or recumbent position for receiving a bottle, the shaft 125 is swung away from the rod 131 and out of its control. Means are provided for swinging the holding finger 123 upward or away from the recumbent cradle so as not to interfere with the movement of the bottle onto the cradle. Such means comprises an arm 137 (Fig. 9) having a pivotal connection 138 with the rod 125. The arm is formed with an elongated slot 139 through which extends a pin 140 on the yoke 78. The slot permits the arm 137 to move up and down with the rod 125 when the latter is actuated as heretofore described. However, when the cradle is swung towards horizontal position, the casing 126 carrying the shaft 125 has its position changed so that the lower or outer end thereof, as shown in broken lines in Fig. 9, is at a greater distance from the pin 140. As a result, said pin operates through the arm 137 to draw the shaft 125 inward, which results in swinging the holding finger away from the cradle. As the cradle is uprighted this movement is reversed, so that the holding finger is swung to bottle holding position, which is retained until the bottle is in position to be released in the manner above set forth.

Figure 4:
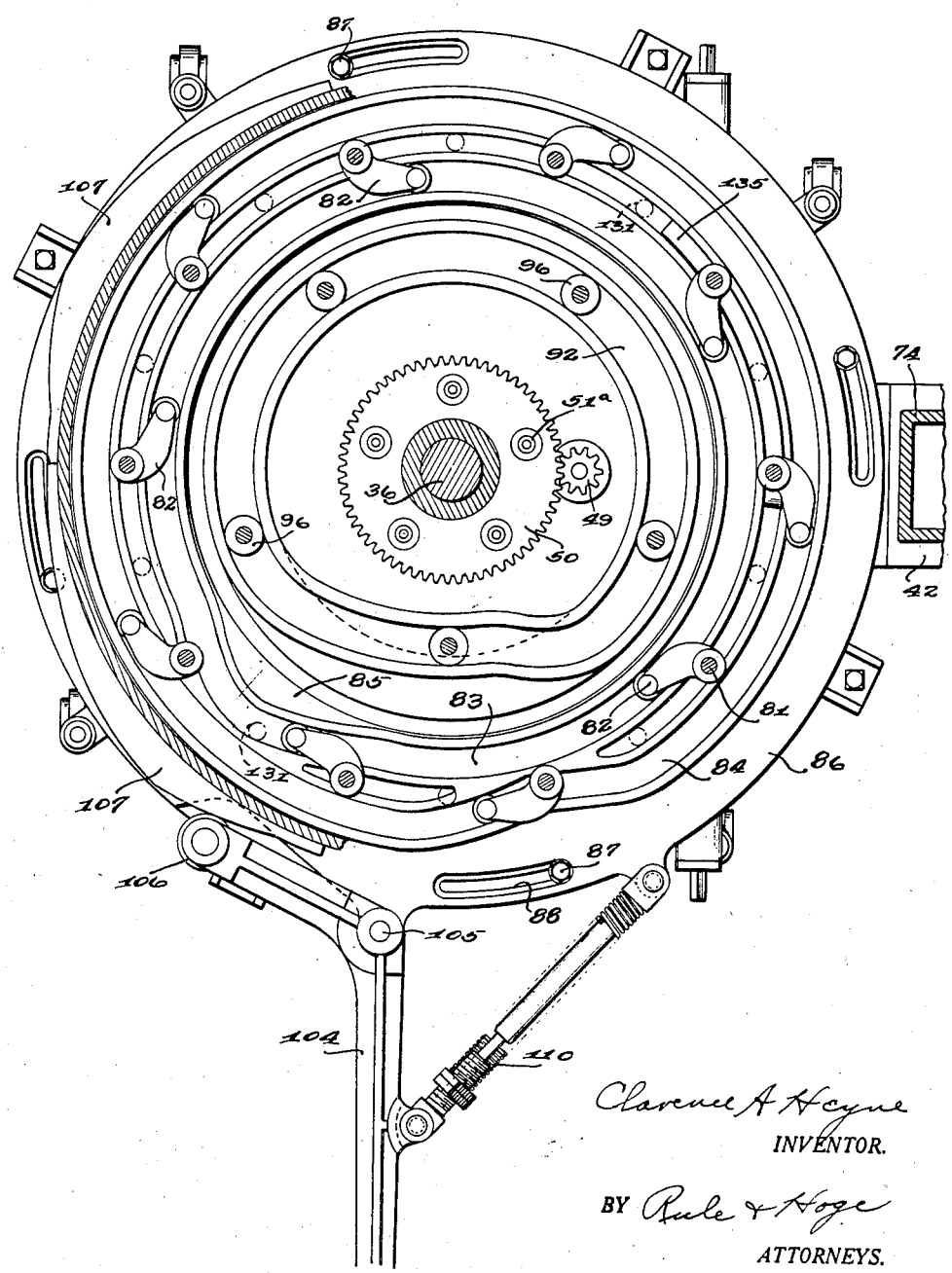
Fig. 4 is a part sectional plan view showing particularly the cams and cam operated devices on and adjacent to the base of the machine.

As heretofore explained, the annular cam supporting plate 86 with the cams thereon, is rotatively adjustable about the axis of the uprighter, such adjustment being permitted by the bolt and slot connections 87, 88 (Fig. 4). By means of such adjustment the time at which, during the rotation of the carriage, the cradles are swung downward to bottle receiving position may be adjustably varied to accommodate such movements to the position of the pony conveyor 23. This adjustment also changes the timing of the horizontal oscillating movements of the cradles by which they are maintained in alignment with the conveyor. As said adjustment of the cam carrying plate does not affect the cam 118 by which the bottom plates 110 are withdrawn, nor the cam 135 which controls the release of the holding fingers 123, the timing of bottle discharging operations retains its proper relation to the position and movements of the conveyor 27.

As indicated in Fig. 14, the position of the uprighter may be changed as desired with respect to the loader 29 and the leer. Thus, for example, the uprighter may be shifted to the broken line position 26ᵃ. In this instance, the main conveyor 27 will be swung into position to receive the bottles from the uprighter at the opposite side of the conveyor.

Modifications may be resorted to within the spirit and scope of my invention.

I claim:

1. Apparatus for transferring articles from forming molds to a leer, comprising an uprighter, a traveling conveyor by which the articles are carried to the uprighter in a recumbent position, said conveyor mounted for lateral swinging movement, said upright comprising a carriage, means for rotating the carriage about a vertical axis, pairs of cradles arranged in an annular series on the carriage and mounted for swinging thereon from a recumbent to an upright position and for oscillation thereon while in a recumbent position, said pairs being brought in succession to a receiving position in which they are recumbent and in register with said conveyor for receiving the articles from the conveyor in a recumbent position, means for swinging said conveyor laterally and thereby causing it to advance with the cradles during the transfer of the articles to the cradles, means for oscillating the cradles on their carriage during the transfer period for maintaining the cradles in alignment with said conveyor, means for swinging each pair of cradles with the articles therein to an upright position, a second traveling conveyor to receive the articles from the cradles, and automatic means to release the articles from the cradles to said second conveyor.

2. Apparatus for transferring articles from forming molds to a leer, comprising an uprighter, a traveling conveyor by which the articles are carried to the uprighter in a recumbent position, said conveyor mounted for lateral swinging movement, said uprighter comprising a carriage, means for rotating the carriage about a vertical axis, pairs of cradles arranged in an annular series on the carriage and mounted for swinging thereon from a recumbent to an upright position and for oscillation thereon while in a recumbent position, said pairs being brought in succession to receiving position in which they are recumbent and in register with said conveyor for receiving the articles from the conveyor in a recumbent position, means for swinging said conveyor laterally and thereby causing it to advance with the cradles during the transfer of the articles to the cradles, means for oscillating the cradles on their carriage during the transfer period for maintaining the cradles in alignment with said conveyor, means for swinging each pair of cradles with the articles therein to an upright position, and means for releasing the articles from the cradles.

3. The combination of a carriage, a horizontally disposed traveling conveyor by which articles are advanced to the carriage in a recumbent position, a supporting frame for the conveyor movable transversely of the carriage, means for rotating the carriage, a cradle mounted on the carriage for swinging movement about an axis eccentric to that of the carriage and periodically brought into alignment with the conveyor by the rotation of the carriage, automatic means for effecting said movement of the supporting frame and conveyor transversely of the carriage and thereby maintaining the conveyor in register with the cradle during the transfer of an article from the conveyor to the cradle, and means for swinging the cradle about said eccentric axis and thereby maintaining the cradle in alignment with the conveyor during the transfer of the article.

4. The combination of a horizontally disposed belt conveyor, a conveyor frame on which the conveyor is mounted, said conveyor and frame being mounted for lateral oscillating movement, a carriage, means for rotating it about a vertical axis, an annular series of article receiving holders mounted for lateral swinging movement on the carriage, means for delivering articles to the conveyor and causing them to be carried thereby to said holders, means for oscillating the conveyor frame to cause it to move laterally in register with said holders during the transfer of articles from the conveyor to the holder, said last mentioned means comprising and annular series of cams mounted on the carriage, an arm actuated by said cams, and operating connections between said arm and frame.

5. The combination of a horizontally disposed belt conveyor, a conveyor frame on which the conveyor is mounted, said conveyor and frame being mounted for lateral oscillating movement, a carriage, means for rotating it about a vertical axis, an annular series of article receiving holders mounted for lateral swinging movement on the carriage, means for delivering articles to the conveyor and causing them to be carried thereby to said holders, means for oscillating the conveyor frame to cause it to move laterally in register with said holders during the transfer of articles from the conveyor to the holder, and means for swinging the said holders on the carriage during said transfer of the article to maintain the holders in alignment with the conveyor.

6. Article transfer apparatus including an uprighter comprising a carriage rotatable about a vertical axis, an annular series of cradles mounted on the carriage, and automatic means for swinging the cradles from a substantially horizontal to an upright position on the carriage, said means comprising a stationary cam, a slide mounted on the carriage for reciprocating movement radially of the carriage and actuated by the cam, and operating connections between said slide and the cradles.

7. Apparatus for transferring articles, said apparatus including an uprighter comprising a carriage, means for rotating the carriage about a vertical axis, an annular series of cradles arranged in pairs on the carriage, devices individual to said pairs for swinging the cradles from an upright to a recumbent position and returning them to an upright position, each said device comprising a yoke pivotally mounted on the carriage between a pair of cradles and operatively connected to the cradles, a stationary cam, and operating connections between the cam and said yokes for actuating the yokes in succession and thereby swinging the pairs of cradles in succession.

8. Apparatus for receiving articles in a recumbent position, swinging them to an upright position and discharging them in upright position, comprising a rotatable carriage, a cradle thereon, means for driving the carriage and causing the cradle to travel in a closed path, means for swinging the cradle on the carriage between substantially horizontal and vertical positions, a holder for holding articles in the cradle during said swinging movement, said holder being mounted to swing with the cradle, automatic means to swing said holder relatively of the cradle to and from an article holding position, said last mentioned means including a cam arranged to swing with said holder, and means actuated by the rotation of the carriage to operate said cam.

9. Apparatus for receiving articles in a recumbent position, swinging them to an upright position and discharging them in upright position, comprising a rotatable carriage, a cradle thereon, means for driving the carriage and causing the cradle to travel in a closed path, means for swinging the cradle on the carriage between substantially horizontal and vertical positions, a holder for holding articles in the cradle during said swinging movement, said holder being mounted to swing with the cradle, automatic means to swing said holder relatively of the cradle to and from an article holding position, said last mentioned means comprising a shaft mounted to swing with the holder, means actuated by the rotation of the carriage to move said shaft endwise, a cam actuated by said endwise movement of the shaft, and means actuated by the cam for operating said holder.

10. The combination of a carriage, means for rotating it, a cradle thereon, a holder for the cradle, said holder mounted on the carriage for swinging movement about a horizontal axis, an article holding finger mounted on said holder to swing relatively to the cradle to and from an article holding position, automatic means for swinging the holder and cradle between an upright and a recumbent position of the cradle, a bottom plate for supporting articles in the cradle while the latter is in an upright position, automatic means for swinging said finger to article holding position while the cradle is in a recumbent position, means for withdrawing said holding finger when the cradle is in upright position, and means for withdrawing said bottom plate when the cradle is in upright position.

11. The combination of a carriage, means for rotating it about a vertical axis, a cradle thereon, automatic means for swinging said cradle from an upright to a recumbent position when it reaches a predetermined point during the rotation of the carriage and thereafter swinging it back to an upright position, means for releasing an article from the cradle when the latter reaches a predetermined discharging position during its rotation with the carriage, and adjusting means for adjustably varying the point at which during the rotation of the carriage the cradle is swung to said recumbent position, said adjusting means being operative to effect said adjustment without changing the point at which the articles are released from the cradle.

12. The combination of a carriage, means for rotating it about a vertical axis, an annular series of cradles arranged in pairs and mounted on the carriage for rotation therewith, a conveyor for conveying articles to the carriage and discharging them onto the cradles, means for swinging said conveyor laterally and thereby causing it to remain in register with the cradles during the transfer of the articles therefrom to the cradles, and means for swinging the cradles horizontally on the carriage during such transfer for maintaining the cradles in alignment with the conveyor.

13. The combination of a carriage, means for rotating it about a vertical axis, an annular series of cradles arranged in pairs and mounted on the carriage for rotation therewith, a conveyor for conveying articles to the carriage and discharging them onto the cradles, means for swinging said conveyor laterally and thereby causing it to remain in register with the cradles during the transfer of the articles therefrom to the cradles, and means for swinging the cradles horizontally on the carriage during such transfer for maintaining the cradles in alignment with the conveyor, said cradle swinging means comprising stationary cams, and mechanisms individual to the cradles actuated by said cams.

14. The combination of a carriage, means for rotating it about a vertical axis, an annular series of cradles arranged in pairs and mounted on the carriage for rotation therewith, a conveyor for conveying articles to the carriage and discharging them onto the cradles, means for swinging said conveyor laterally and thereby causing it to remain in register with the cradles during the transfer of the articles therefrom to the cradles, and means for swinging the cradles horizontally on the carriage during such transfer for maintaining the cradles in alignment with the conveyor, said cradle swinging means comprising stationary cams, and mechanisms individual to the cradles actuated by said cams, the said mechanisms for operating one cradle of each pair being controlled by one of said cams and the said mechanisms for operating the other cradle of each pair being controlled by the other of said cams.

CLARENCE A. HEYNE.